3,100,054
TILTABLE BOWL
George J. Rubens, 6460 Penfield Ave.,
Woodland Hills, Calif.
Filed Feb. 7, 1961, Ser. No. 87,672
5 Claims. (Cl. 215—1)

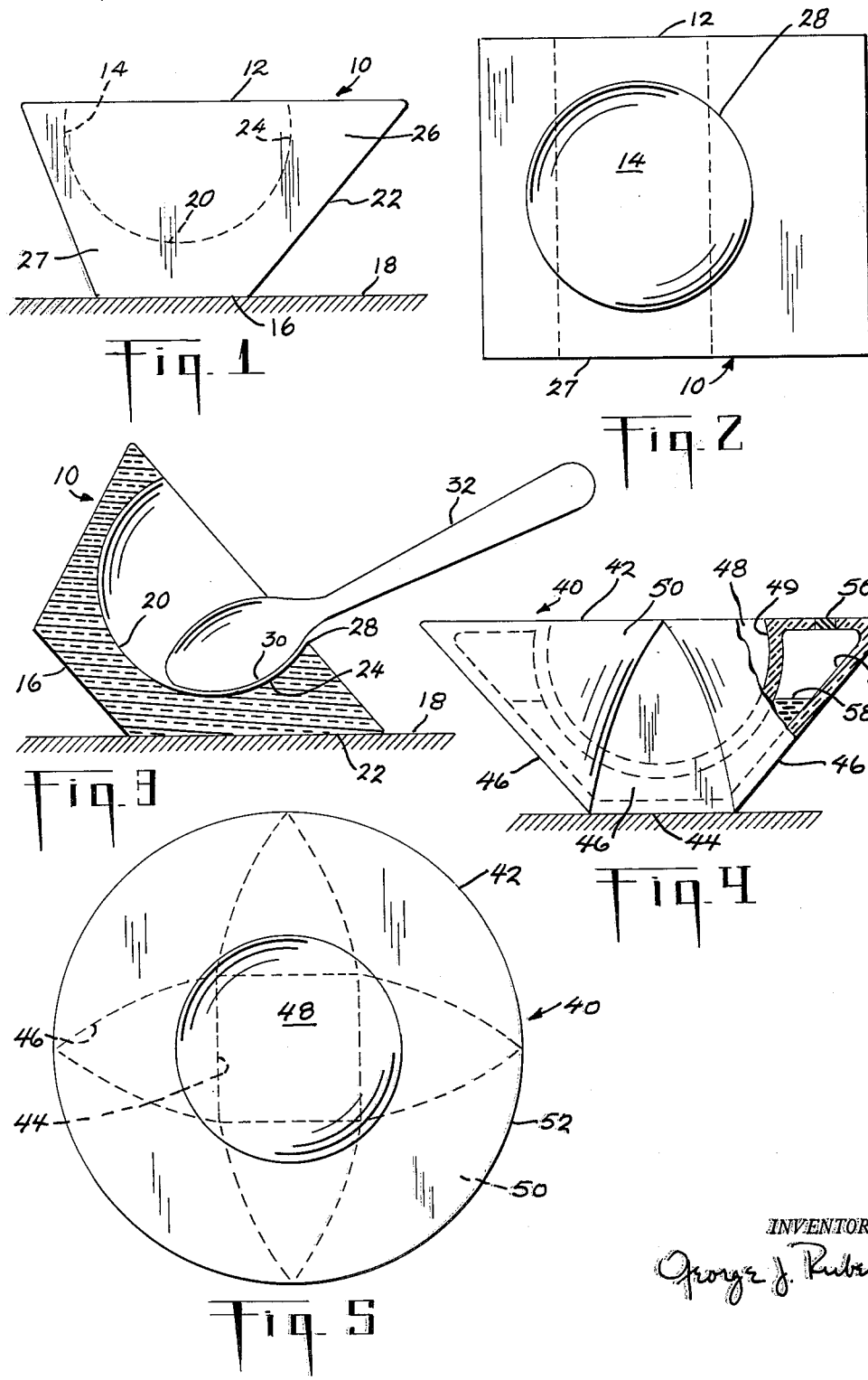
Aug. 6, 1963     G. J. RUBENS     3,100,054
TILTABLE BOWL
Filed Feb. 7, 1961
INVENTOR.
George J. Rubens

This invention relates to dishes, and more particularly to a bowl capable of being supported in a plurality of positions with respect to the vertical to afford better access by a spoon.

Within several months after birth, a baby's milk diet is invariably supplemented by solid foods in the form of dry cereals, etc. which are mixed with milk to form the consistency of a thick liquid, as well as strained vegetables, etc. At the present time, a mother uses any available container for such food, such as a small glass, cup, saucer, etc. In the following description, the word "bowl" wherever used generally defines such containers.

Usually the food is dispensed from such a container while the mother is holding the child, and, therefore only one hand is available for manipulating the food and utensils. When the container is small and full it is not difficult to dispense the food by spoon. However, when a saucer is used, or the level in deeper containers reaches such a low level that only a small portion of the food is gathered by the tip of the spoon when scrapped along the bottom of the container, the removal of the food by the mother becomes a most tedious and annoying task, such that the residual portion is many times discarded. Even under ideal conditions, feeding a constantly moving child is inherently a time-consuming experience demanding great patience.

Since the initial amount of food prepared for the baby is necessarily small, being gradually increased, the mother finds it incumbent to make more food than is required to account for the residual portion that she is unable to conveniently remove from the bowl. Although food wastage may not be an important factor to some mothers, there is an instinctive characteristic of all mothers to more than fully satisfy the food requirements of their babies which compels them to scrape the botom clean regardless of the inconvenience and time involved. Furthermore, it is a common custom to mix a liquid vitamin with the cereal, and in this case, any food waste may be a more expensive habit.

The present invention provides a bowl-like container having an inner cavity and a plurality of outer surfaces capable of supporting the bowl in different positions with regard to the vertical. A primary base surface supports the bowl in a normal position with the cavity in an upright position. The bowl is also provided with one or more secondary base surfaces to support the bowl in tilted positions. The bowl cavity is so configured that when the bowl is in a tilted position, the inner surface of the cavity on the corresponding side, as the secondary base, forms a concave portion, which can be called a secondary concavity portion. The curvature of the secondary concavity portion is preferably substantially arcuate to conform to the curvature of the side edge of the food bearing portion of the spoon to facilitate and expedite removal of substantially all of the residual food on the secondary concavity portion.

A primary purpose of this invention is to provide a bowl or the like that will facilitate removal of the entire contents by a spoon or the like.

Another important object of this invention is to provide a bowl or the like capable of supporting food in at least two stable positions, namely, in an upright bowl position and a tilted bowl position, and a corollary object is to provide such a bowl with corresponding bases to support the bowl in both positions in a stable condition with or without the presence of the bowl contents.

A further object is to provide such a bowl having a cavity, a side portion of which when the bowl is tilted conforms to the curvature of a longitudinal edge of the food-supporting portion of a spoon to facilitate removal of the contents of the bowl.

Other objects and many of the attendant advantages of this invention will be readily appreciated as the same become better understood by reference to the following detailed description when considered in connection with the accompanying drawing wherein:

FIG. 1 is a side elevation of a preferred embodiment of the invention bowl supported on a primary base in a normal upright position for the initial feeding operation;

FIG. 2 is a top plan view of the container of FIG. 1;

FIG. 3 is a similar view of the bowl in FIGS. 1 and 2 with the bowl tilted on a secondary base for the remaining feeding operation and illustrating a spoon in the position of removing food on the secondary cavity portion on which the remaining contents of the bowl settles;

FIG. 4 is a side elevation of a modified bowl having a plurality of secondary bases, a portion of the bowl being cut away to show the details for shifting the center of gravity; and FIG. 5 is a top plan view of the modified bowl of FIG. 4.

Referring to the drawing where like reference numerals refer to similar parts throughout the figures, there is shown in FIGS. 1–3 a preferred construction of a bowl 10 constructed according to the present invention, which bowl 10 comprises a body 12 having a food cavity 14, the bowl being constructed of any conventional material for making dishes, such as ceramic, glass, plastic and the like. Body 12 is provided with an outer surface 16, which may be considered a primary base, on which the bowl is normally supported on a surface 18 with cavity 14 in an upright position. In this position a vertical line passing through the bowl's center of gravity intersects a primary bottom 20 of cavity 14 and primary base 16, enabling the bowl to remain upright in a stable position, such as any conventional bowl, from which position food in the cavity can be removed by a spoon or the like in the usual manner.

To enable bowl 10 to be tilted on its side, the outer body surface is also formed with at least one secondary base 22 on which the bowl is adapted to be supported in that position. Bases 16 and 22 are shown in the drawing as planar surfaces being the simplest construction and which form usually offers the most stable surface, although legs etc. could be provided on the body to accomplish this purpose, as long as the legs define a planar support surface. As a flat surface, secondary base 22 is disposed at an obtuse angle to base 16 such that the vertical line passing through the center of gravity of the bowl intersects a secondary bottom 24 of cavity 14 and secondary base 22, the bottom 24 being on the same corresponding side of the bowl as secondary base 22. With such a shift in the center of gravity, the bowl should remain in a stable condition when tilted and supported on secondary base 22, with or without the presence of food in cavity 14. To further ensure stability of the bowl in the tilted position, with a circular cavity 14, the secondary base 22 is made longer than the primary base presenting an enlarged mass of the bowl material in the area of point 26. If necessary, as may be the case when the body is made of light weight materials or because of the shape of the body, a heavier weight 26 can be imbedded in the bowl to provide additional stability when the bowl is in the tilted position of FIG. 3. The sides 27 of the body may be curved or flat and on which may be displayed suitable pictorial representations for a baby.

In FIGS. 1-3, cavity 14 may be formed slightly larger than semihemispherical to provide a peripheral lip 28 to increase the depth of the cavity in the tilted bowl position of FIG. 3 and the amount of food contained on secondary bottom 24. The curvature of the secondary bottom 24 is generally elliptical, approximating the curvature of the long edge 30 of a conventional spoon 32 to facilitate removal of the residual portion of the food that will gravitate or be scraped on to the secondary bottom 24 when the bowl is in a tilted position.

FIGS. 4 and 5 illustrate a bowl 40 which differs from bowl 10 in that the former is symmetrical about a vertical axis. Bowl 40 comprises a body 42 having an outer surface formed with a principal base 44 and four symmetrically disposed secondary bases 46. It is obvious that more or less secondary bases could be used than the four shown. Body 42 is provided with a food cavity 48, which corresponds to cavity 14 of the prior modification, but has four secondary bottom portions 49, one corresponding to each secondary base 46. In this modification the exterior surfaces 50 between adjacent secondary bases 46 are curved to produce a circular upper peripheral edge 52, and the seconday bases are somewhat triangular in shape; however, the sides and bases can be made square as in FIGS. 1-3.

Body 42 can be made of solid materials such as described with reference to FIGS. 1-3, although, should additional stability be desired when the bowl is tilted on one of the several secondary bases, the body may be constructed of a hollow shell formed with a core 54 having a filling aperture and plug 56. Core 54 may be partially filled with a suitable material 58 such as water, a heavy liquid, or granulated material that is movable to shift the center of gravity of the bowl over the particular secondary base on which the bowl is tilted so that the bowl remains stable in the selected position.

Bowls 10 and 40 are used in the same way. Food is placed in the bowl in an upright position and dispensed by spoon from that position until the level of the food lowers to where a relatively small amount of the food is gathered by the tip of the spoon. When this condition is reached, the bowl is tipped by the user on a selected secondary base, and the food gathered on the respective secondary bottom of the cavity where it can be easily picked up by the side of the spoon. Thus, not only can all of the food be removed from the bowl but it can be removed faster and easier requiring the use of only one hand.

I claim:

1. A self-supportable bowl having a large mouthed cavity from which food is normally dispensed by a spoon, said bowl having a plurality of rigid outer planar support surfaces each of which is adapted to act as a self-supporting base for the bowl, the planes defining said surfaces intersecting whereby said bowl can be self-supported in a plurality of selected positions to the vertical corresponding to said surfaces, one of said outer surfaces representing a primary base for supporting the bowl with the cavity in a normally upright position from which the food can be dispensed by a tip of the food bearing portion of the spoon, and another of said outer surfaces representing a secondary base for supporting the bowl in a stable condition with the cavity in a tilted position offset from the vertical from which a residual portion of the food in the cavity can be dispensed by the spoon, a vertical line passing through the center of gravity of said bowl intersecting the secondary base when the bowl is in a tilted position to enable the bowl to be self-supportable in the tilted position, the surface of the cavity on the same side of the bowl as the secondary base conforming substantially to the longitudinal curved edge of the food bearing portion of the spoon wherein the surface of the cavity is substantially uniformly curved throughout and the amount of the curved surface being substantially hemispherical in extent, whereby the residual portion of any food present in the bowl in the tilted position can be readily removed by scraping the longitudinal edge of the spoon along the corresponding curved surface portion of the cavity.

2. The bowl of claim 1, wherein the mouth of the cavity is provided with an inwardly directed peripheral lip.

3. The bowl of claim 1, wherein the bowl includes a supplemental means for shifting the center of gravity of the bowl when the bowl is supported on the secondary base to maintain the bowl in the tilted position.

4. The bowl of claim 1, wherein the bowl has a hollow portion, a flowable material filling only a portion of said hollow portion, whereby the center of gravity of said bowl is shifted when the bowl is supported on the secondary base to maintain the bowl in the tilted position.

5. The bowl of claim 4, wherein said flowable material is a liquid.

References Cited in the file of this patent

UNITED STATES PATENTS

| | | |
|---|---|---|
| 1,659,383 | Thiene et al. | Feb. 14, 1928 |
| 2,121,165 | Slobodkin | June 21, 1938 |
| 2,219,974 | Bellow | Oct. 29, 1940 |

FOREIGN PATENTS

| | | |
|---|---|---|
| 20,636 | Great Britain | of 1890 |
| 92,713 | Switzerland | Feb. 16, 1922 |